April 7, 1936. S. B. GRISCOM 2,036,270
INITIATING ELEMENT FOR AUTOMATIC OSCILLOGRAPHS
Filed Dec. 20, 1934
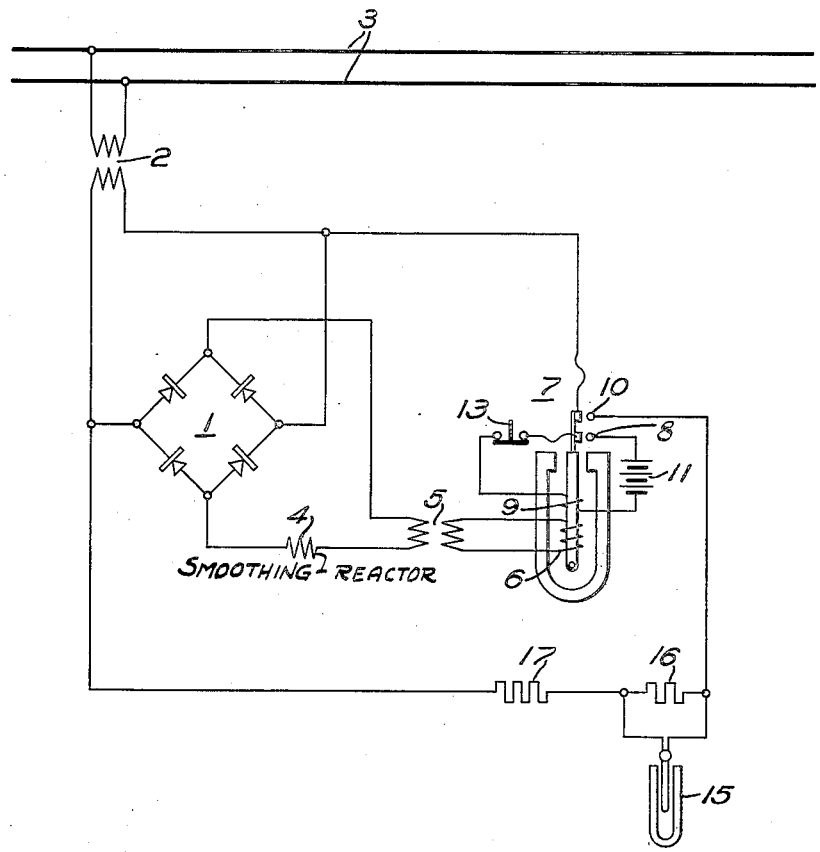

Patented Apr. 7, 1936

2,036,270

UNITED STATES PATENT OFFICE 2,036,270

INITIATING ELEMENT FOR AUTOMATIC OSCILLOGRAPHS

Samuel B. Griscom, Pittsburgh, Pa., assignor to Westinghouse Electric & Manufacturing Company, East Pittsburgh, Pa., a corporation of Pennsylvania Application December 20, 1934, Serial No. 758,418

7 Claims. (Cl. 171—95)

My invention relates to fault-responsive elements for alternating-current circuits, and particularly, to undervoltage elements suitable for high-speed relay applications. Although not limited thereto, my invention is particularly applicable to undervoltage starting elements for automatic oscillographs.

Such elements, as heretofore constructed, have been designed and connected to respond to the absolute magnitude of line voltage and to initiate operation of the oscillograph element when the line voltage decreases below a predetermined value. As the voltage of power circuits, even where induction regulators are provided, varies somewhat, these starting elements cannot be set very closely to the rated normal voltage of the circuit. For example, if the power circuit voltage varies through a 5% range above and below rated voltage, the initiating element must be set to respond to a maximum voltage somewhat below the lower limit of the 5% range. If set 2% below this limit the decrease of line voltage necessary to effect operation may vary from 2% to 12%, depending upon whether the line voltage is at the lower or upper limit of the 5% plus or minus range of normal voltage.

Even then, the change in relay energy available to cause operation is small considering the size of the relay parts and the amount of energy stored in the relay continuously. For example, if the force on the movable element varies with the square of voltage, which is probably the most favorable relationship for fast operation which can be secured, the energy available for operation in response to a 2% voltage change would be $(1^2-(.98)^2)$ 100 or 4% of the energy normally stored in the relay.

In order to avoid these difficulties inherent in the known forms of starting elements, I propose to utilize the time-derivative of voltage as the controlling relay variable, and to distinguish between normal voltage variations and faults by the direction and magnitude of the rate of change of line voltage. As the change of line voltage occasioned by a fault is more abrupt than the normal variations of voltage level, it is feasible to select faults in this manner.

It is, accordingly, an object of my invention to provide a novel undervoltage element which will satisfactorily operate in response to the rate of change of line voltage occasioned by a fault.

A further object of my invention is to provide a novel initiating element for oscillographs which will distinguish between the abrupt changes of voltage brought about by faults and the gradual changes accompanying normal variations of voltage level caused by compensating for line drop, etc.

Other objects of my invention will become evident from the following detailed description, taken in conjunction with the accompanying drawing, in which the single figure is a diagrammatic view of an oscillograph control system embodying my invention, the optical and photographic elements of the oscillograph being, for simplicity, omitted.

Referring to the drawing in detail, a rectifier 1, preferably of the full-wave bridge circuit type, is connected by means of a potential transformer 2 to the transmission or distribution circuit 3 to be observed. The output terminals of the rectifier 1 are connected in series with a suitable smoothing reactor 4 to the primary winding of a transformer 5. It will be understood that the smoothing reactor 4 serves as a filter for the suppression of harmonics and may be replaced by any of the more complicated forms of filters for this purpose known in the art.

The secondary winding of the transformer 5 is connected to the operating coil 6 of a polarized relay 7, in such direction that a decrease of voltage of the circuit 3 will produce a closing torque in the relay. The relay 7 is also provided with a holding coil 9, which is connected in series with a battery 11, a switch 13 and a pair of front contacts 8 of the relay 7. The relay 7 is designed to close in response to a rate of change of line voltage above a predetermined value higher than the values caused by the operation of regulators and dynamo-electric machinery, but lower than the values produced by faults.

The relay 7 is provided with front contacts 10, connected in any suitable manner to control the energization of an oscillograph element 15, which for simplicity, is shown as connected for energization in accordance with the voltage of circuit 3. The oscillograph element 15 is provided with the usual shunt 16 and series resistor 17.

The operation of the above-described apparatus may be set forth as follows: During normal conditions of the circuit 3, the potential transformer 2 supplies alternating voltage to the rectifier 1, and a rectified current of substantially constant value flows in the primary winding of transformer 5. The pulsations of primary current produce a small alternating voltage across the secondary winding of transformer 5, which, however, does not cause the circulation of sufficient current in the relay 7 to effect closure thereof. The operation of induction regulators, motors, etc., connected to the circuit 3 produce voltage variations of the order of 2 to 5% of normal in time intervals of the order of ½ to 5 seconds. These variations produce direct currents in one direction or the other in the secondary circuit of transformer 5, but the rates of change of line voltage are below the predetermined value at which relay 7 is designed to close, and the latter remains open.

If a fault occurs on the circuit 3 or on a connected power circuit, an abrupt decrease of line voltage, of the order of 2% to 100% of normal occurs, regardless of the magnitude of line voltage before the fault. This decrease of voltage represents, principally, reactance drops in conductors, transformers and generators during the initial rush of fault current, and reaches its maximum value in a time interval of the order of ½ cycle.

The rate of change of line voltage is, accordingly, quite high, causing an abrupt reduction of the energy stored in the transformer 5 and a correspondingly large current to circulate through the operating coil 6 of relay 7. As this current is in the proper direction to effect closure of relay 7, the latter closes. The relay 7, in closing, connects the oscillograph element 15 for energization, and establishes a holding circuit for itself through the battery 11 and switch 13.

It will be noted that, upon energization of the circuit 3 after it has been deenergized, an abrupt change of line voltage occurs at a rate sufficiently high to cause operation of the relay 7. However, as this change of voltage is an increase, the time-derivative of voltage is of opposite sign to that produced by a fault, and the direct current circulated in the coil of relay 7 is in the wrong direction to effect operation of the polarized relay.

The switch 13 may be operated by any suitable device, such as a circuit breaker (not shown), preferably with time delay, to stop the operation of the oscillograph after the transient under observation has ceased.

The inductive time delay in the circuit of transformer 5 may be reduced by omitting the reactor 4, adding external resistance etc., in accordance with the usual methods. For exceptionally high speed, one of the more complicated forms of harmonic filters would be substituted for the reactor 4, and the series resistance of the transformer circuits would be made high.

I do not intend that the present invention shall be restricted to the specific structural details, arrangement of parts or circuit connections herein set forth, as various modifications thereof may be effected without departing from the spirit and scope of my invention. I desire therefore that only such limitations shall be imposed as are indicated in the appended claims.

I claim as my invention:

1. In apparatus responsive to an undervoltage condition of an alternating-current circuit, an electrical energy storage device, means including a rectifier for maintaining said device unidirectionally energized to a degree dependent upon a voltage condition of said circuit, and a relay operable in response to a change of stored energy in said device at a rate above a predetermined value and in a predetermined direction only.

2. In apparatus responsive to an undervoltage condition of an alternating-current circuit, an inductance device having a plurality of mutually inductive winding turns, means including a rectifier for maintaining a direct current dependent upon a voltage condition of said circuit in a portion of said turns, and a relay responsive to a voltage of at least a predetermined value acting in a predetermined direction only, induced in another portion of said turns.

3. In apparatus responsive to an undervoltage condition of an alternating-current circuit, a transformer having electrically separate primary and secondary windings, means including a rectifier for maintaining a direct current dependent upon a voltage condition of said circuit in said primary winding, and a relay responsive to a voltage of at least a predetermined value acting in a predetermined direction only, induced in said secondary winding.

4. In apparatus responsive to an undervoltage condition of an alternating-current circuit, an electrical energy-storage device, means including a rectifier for maintaining said device unidirectionally energized to a degree dependent upon a voltage condition of said circuit, and a polarized relay responsive to a current condition of said device dependent upon the rate of change of stored energy therein.

5. In apparatus responsive to an undervoltage condition of an alternating-current circuit, an electrical energy storage device, means including a rectifier for maintaining said device unidirectionally energized to a degree dependent upon a voltage condition of said circuit, a relay operable only in response to a change of stored energy of said device at a rate above a predetermined value and in a direction corresponding to a reduction of voltage of said alternating-current circuit, a translating device and energizing means therefor including a holding circuit controlled by said relay.

6. In apparatus responsive to an undervoltage condition of an alternating-current circuit, a transformer having electrically separate primary and secondary windings, means including a rectifier for maintaining a direct current dependent upon a voltage condition of said circuit in said primary winding, a relay responsive to a voltage of at least a predetermined value acting in a direction corresponding to a reduction of voltage of said alternating-current circuit induced in said secondary winding, a translating device, and energizing means therefor controlled by said relay.

7. In an automatic oscillograph, initiating apparatus responsive to an undervoltage condition of an alternating-current circuit comprising a transformer having electrically separate primary and secondary windings, means including a rectifier for maintaining a direct current dependent upon a voltage condition of said circuit in said primary winding, a polarized relay responsive to a voltage of at least a predetermined value acting in a direction corresponding to a reduction of voltage of said alternating-current circuit induced in said secondary winding, a holding circuit for said relay, and an oscillograph element controlled by said relay.

SAMUEL B. GRISCOM.